US008105659B2

(12) United States Patent
Chretien et al.

(10) Patent No.: US 8,105,659 B2
(45) Date of Patent: Jan. 31, 2012

(54) METHOD OF CONTROLLING GLOSS WITH CURING ATMOSPHERE USING RADIATION CURABLE INK OR OVERCOAT COMPOSITIONS

(75) Inventors: Michelle N. Chretien, Mississauga (CA); Peter G. Odell, Mississauga (CA); Jennifer L. Belelie, Oakville (CA); Gordon Sisler, St. Catherines (CA); Christopher A. Wagner, Etobicoke (CA)

(73) Assignee: Xerox Corporation, Norwalk, CT (US)

( * ) Notice: Subject to any disclaimer, the term of this patent is extended or adjusted under 35 U.S.C. 154(b) by 872 days.

(21) Appl. No.: 12/171,815

(22) Filed: Jul. 11, 2008

(65) Prior Publication Data

US 2010/0021698 A1 Jan. 28, 2010

(51) Int. Cl.
*C08J 7/04* (2006.01)

(52) U.S. Cl. ........ 427/495; 427/487; 427/493; 427/494; 427/510; 427/511; 427/512; 427/514; 427/532; 427/553; 106/31.13; 522/1; 522/6; 347/102

(58) Field of Classification Search .................. 427/487, 427/493, 494, 495, 510, 511, 512, 514, 532, 427/553; 106/31.13; 522/1, 6; 347/102
See application file for complete search history.

(56) References Cited

U.S. PATENT DOCUMENTS

| | | | | |
|---|---|---|---|---|
| 4,048,036 | A * | 9/1977 | Prucnal | 522/8 |
| 4,169,167 | A | 9/1979 | McDowell | |
| 4,391,686 | A | 7/1983 | Miller et al. | |
| 7,276,614 | B2 | 10/2007 | Toma et al. | |
| 7,279,587 | B2 | 10/2007 | Odell et al. | |
| 2002/0128340 | A1* | 9/2002 | Young et al. | 522/1 |
| 2003/0054116 | A1 | 3/2003 | Dawson et al. | |
| 2003/0158283 | A1* | 8/2003 | Ylitalo et al. | 522/74 |
| 2003/0164571 | A1* | 9/2003 | Crump et al. | 264/85 |
| 2004/0137205 | A1* | 7/2004 | MacQueen et al. | 428/204 |
| 2005/0018595 | A1* | 1/2005 | Conroy et al. | 369/288 |
| 2005/0249895 | A1* | 11/2005 | Sisler et al. | 428/32.34 |
| 2006/0230969 | A1 | 10/2006 | Vosahlo | |
| 2007/0120921 | A1 | 5/2007 | Carlini et al. | |
| 2007/0120924 | A1 | 5/2007 | Odell et al. | |
| 2007/0142492 | A1* | 6/2007 | Odell et al. | 522/74 |
| 2008/0000384 | A1* | 1/2008 | Belelie et al. | 106/31.13 |
| 2008/0122914 | A1* | 5/2008 | Toma et al. | 347/100 |
| 2008/0218570 | A1* | 9/2008 | Kovacs et al. | 347/88 |
| 2009/0038506 | A1* | 2/2009 | Odell et al. | 106/31.13 |
| 2009/0085046 | A1* | 4/2009 | Jasmin et al. | 257/88 |
| 2009/0104373 | A1* | 4/2009 | Vanbesien et al. | 427/553 |
| 2009/0136681 | A1* | 5/2009 | Belelie et al. | 427/532 |
| 2009/0258155 | A1* | 10/2009 | Odell et al. | 427/519 |
| 2009/0317559 | A1* | 12/2009 | Belelie et al. | 427/487 |

OTHER PUBLICATIONS

Canadian Office Action mailed Jan. 31, 2011 in Canadian Patent Application No. 2,671,134.
U.S. Appl. No. 12/144,233, filed Jun. 23, 2008.
U.S. Appl. No. 12/023,979, filed Jan. 31, 2008.
Katia Studer et al., "Overcoming Oxygen Inhibition in UV-Curing of Acrylate Coatings by Carbon Dioxide Inerting, Part I", Progress in Organic Coatings, 2003, vol. 48, pp. 92-100.
European Search Report mailed Nov. 2, 2009.

* cited by examiner

*Primary Examiner* — Charles Boyer
(74) *Attorney, Agent, or Firm* — Oliff & Berridge, PLC

(57) ABSTRACT

A method of controlling gloss of an image includes forming an image over a substrate by applying a colored or colorless composition, included a colored ink and/or a colorless overcoat composition, over one or more portions of the substrate, wherein the colored or colorless composition includes at least one gellant, at least one curable monomer, at least one curable wax and optionally at least one photoinitiator, wherein the colored or colorless composition is curable upon exposure to radiation, and curing the colored or colorless composition following application by applying radiation to the colored or colorless composition and, during the curing, controlling an amount of oxygen present in an atmosphere around the image.

9 Claims, No Drawings

METHOD OF CONTROLLING GLOSS WITH CURING ATMOSPHERE USING RADIATION CURABLE INK OR OVERCOAT COMPOSITIONS

BACKGROUND

Described herein are methods of controlling gloss of an image through control of the atmosphere during curing of a radiation curable ink and/or overcoat.

The gloss control method herein provides several advantages, including permitting the gloss of the image to be controlled in a straightforward manner, and possibly without the need for use of different compositions to achieve different gloss levels. Other advantages will be apparent from the description herein.

Many printing applications requiring variable gloss levels, such as photo publishing, are experiencing tremendous growth. As a result, the ability to control printed gloss levels is desirable. However, current printer products typically produce a generally narrow range of gloss, and the gloss level (matte, semi-gloss, gloss) is typically not adjustable by the customer.

In co-pending application Ser. No. 12/144,233 (entitled "Method of Controlling Gloss in UV Curable Overcoat Compositions," Jennifer L. Belelie et. al.) described is a method of controlling gloss of an image by adjusting the amount of curable wax in the composition and/or by adjusting the amount of overcoat composition to apply.

What is still desired is an improved method of controlling the gloss of an image when using a radiation curable ink and/or overcoat composition, both capable of being digitally applied.

SUMMARY

In embodiments, described is a method of controlling gloss of an image comprising forming an image over a substrate by applying a colored or colorless composition, such as a colored ink for forming a visible image, a colorless ink for forming an invisible image (for example, for use in security applications), a colorless overcoat composition, and the like, over one or more portions of the substrate, wherein the colored or colorless composition is comprised of at least one gellant, at least one curable monomer, at least one curable wax and optionally at least one photoinitiator, wherein the colored or colorless composition is curable upon exposure to radiation, and curing the colored or colorless composition following application by applying radiation to the colored or colorless composition and, during the curing, controlling an amount of oxygen present in an atmosphere around the image.

Also described is a method of controlling gloss of a color image, comprising forming an image over a substrate by applying a colored composition over one or more portions of the substrate, wherein the colored composition is comprised of at least one gellant, at least one curable monomer, at least one curable wax, at least one colorant and optionally at least one photoinitiator, wherein the colored composition is curable upon exposure to radiation, and curing the colored composition following application by applying radiation to the colored composition and, during the curing, controlling an amount of oxygen present in an atmosphere around the image.

Further is described a method of controlling gloss of an image, comprising forming an image over a substrate, applying an overcoat composition over one or more portions of the image, wherein the overcoat composition is comprised of at least one gellant, at least one curable monomer, at least one curable wax and optionally at least one photoinitiator, wherein the overcoat composition is curable upon exposure to radiation, and curing the overcoat composition by applying radiation to the overcoat composition and, during the curing, controlling an amount of oxygen present in an atmosphere around the overcoat composition.

Still further is described an image having a controlled gloss, the image comprising a cured colored or colorless composition over one or more portions of the substrate comprised of at least one gellant, at least one curable monomer, at least one curable wax and optionally at least one photoinitiator, and wherein the gloss of the image is controlled to be different from a gloss of the image obtained when a same colored or colorless is cured in ambient air.

EMBODIMENTS

Described are methods of controlling gloss of an image with a radiation curable colored composition, for example a colored ink composition, and/or with a radiation curable colorless composition, for example a colorless ink such as used in security applications and/or a colorless overcoat composition, through control of the oxygen in the atmosphere surrounding the composition during the curing of the composition. Through appropriate control of the amount of oxygen present during the curing, the end image can be made to have a gloss substantially equal to a desired gloss, for example a desired gloss determined prior to formation of the image, and different from a gloss otherwise obtained by curing of the same composition in ambient air/oxygen conditions. Substantially equal gloss refers to, for example, the gloss of the image, at least at the portion of the image to which the overcoat composition is applied, being within about 10%, desirably within about 5% or within about 2%, of the desired gloss. The control of gloss via control of the amount of oxygen present during the curing is believed to be at least somewhat associated with the composition of the colored or colorless composition.

The colored or colorless composition is comprised of at least one gellant, at least one curable monomer, at least one curable wax and optionally at least one photoinitiator. For a colored composition, the composition further includes at least one colorant, such as a pigment, dye, mixture of pigments, mixture of dyes, or mixture of pigments and dyes, present in an amount of about 0.5% to about 15% by weight of the composition, such as from about 1% to about 10% by weight of the composition. For colorless compositions, the composition is substantially free of colorant, including completely free of colorant. An overcoat composition is desirably substantially free of colorant.

The composition is a radiation curable, particularly a UV curable, composition comprising at least one gellant, at least one curable monomer, at least one curable wax, and optionally at least one photoinitiator. The composition may also optionally include a stabilizer, a surfactant, or other additives.

The composition may be applied at temperatures of from about 50° C. to about 120° C., such as from about 70° C. to about 90° C. At application temperatures, the composition may have a viscosity of from about 5 to about 16 cPs, such as from about 8 to 13 cPs. Viscosity values set forth herein are obtained using the cone and plate technique, at a shear rate of $1\ S^{-1}$. The compositions are thus well suited for use in devices in which the composition can be digitally applied, such as applied via ink jets. The compositions may also be applied by other methods, including offset printing techniques.

The at least one gellant, or gelling agent, functions at least to increase the viscosity of the composition within a desired temperature range. For example, the gellant forms a solid-like gel in the composition at temperatures below the gel point of the gellant, for example below the temperature at which the composition is applied. For example, the composition ranges in viscosity from about $10^3$ to about $10^7$ cPs, such as from about $10^{3.5}$ to about $10^{6.5}$ cPs, in the solid-like phase. The gel phase typically comprises a solid-like phase and a liquid phase in coexistence, wherein the solid-like phase forms a three-dimensional network structure throughout the liquid phase and prevents the liquid phase from flowing at a macroscopic level. The composition exhibits a thermally reversible transition between the gel state and the liquid state when the temperature is varied above or below the gel point of the composition. This temperature is generally referred to as a sol-gel temperature. This cycle of gel reformation can be repeated a number of times, since the gel is formed by physical, non-covalent interactions between the gelling agent molecules, such as hydrogen bonding, aromatic interactions, ionic bonding, coordination bonding, London dispersion interactions, or the like.

The temperature at which the composition is in gel state is, for example, approximately from about 15° C. to about 55° C., such as from about 15° C. to about 50° C. The gel composition may liquefy at temperatures of from about 60° C. to about 90° C., such as from about 70° C. to about 85° C. In cooling from the application temperature liquid state to the gel state, the composition undergoes a significant viscosity increase. The viscosity increase is at least a three orders of magnitude increase in viscosity, such as at least a four order of magnitude increase in viscosity.

Gellants suitable for use in the radiation curable compositions include a curable gellant comprised of a curable amide, a curable polyamide-epoxy acrylate component and a polyamide component, a curable composite gellant comprised of a curable epoxy resin and a polyamide resin, mixtures thereof and the like. Inclusion of the gellant in the composition permits the composition to be applied over a substrate, such as on one or more portions of the substrate and/or on one or more portions of an image previously formed on the substrate, without excessive penetration into the substrate because the viscosity of the composition is quickly increased as the composition cools following application. Excessive penetration of a liquid into a porous substrate such as paper can lead to an undesirable decrease in the substrate opacity. The curable gellant may also participate in the curing of monomer(s) of the composition.

The gellants suitable for use in the composition may be amphiphilic in nature in order to improve wetting when the composition is utilized over a substrate having silicone or other oil thereon. Amphiphilic refers to molecules that have both polar and non-polar parts of the molecule. For example, the gellants may have long non-polar hydrocarbon chains and polar amide linkages.

Amide gellants suitable for use include those described in U.S. Pat. Nos. 7,276,614 and 7,279,587, the entire disclosures of which are incorporated herein by reference.

As described in U.S. Pat. No. 7,279,587, the amide gellant may be a compound of the formula

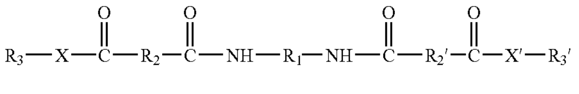

wherein:

$R_1$ is:

(i) an alkylene group (wherein an alkylene group is a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group) having from about 1 carbon atom to about 12 carbon atoms, such as from about 1 carbon atom to about 8 carbon atoms or from about 1 carbon atom to about 5 carbon atoms, although the number of carbon atoms can be outside of these ranges, (ii) an arylene group (wherein an arylene group is a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group) having from about 1 carbon atom to about 15 carbon atoms, such as from about 3 carbon atoms to about 10 carbon atoms or from about 5 carbon atoms to about 8 carbon atoms, although the number of carbon atoms can be outside of these ranges, (iii) an arylalkylene group (wherein an arylalkylene group is a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group) having from about 6 carbon atoms to about 32 carbon atoms, such as from about 6 carbon atoms to about 22 carbon atoms or from about 6 carbon atoms to about 12 carbon atoms, although the number of carbon atoms can be outside of these ranges, or (iv) an alkylarylene group (wherein an alkylarylene group is a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group) having from about 5 carbon atoms to about 32 carbon atoms, such as from about 6 carbon atoms to about 22 carbon atoms or from about 7 carbon atoms to about 15 carbon atoms, although the number of carbon atoms can be outside of these ranges, wherein the substituents on the substituted alkylene, arylene, arylalkylene, and alkylarylene groups can be (but are not limited to) halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are:

(i) alkylene groups having from about I carbon atom to about 54 carbon atoms, such as from about 1 carbon atom to about 48 carbon atoms or from about 1 carbon atom to about 36 carbon atoms, although the number of carbon atoms can be outside of these ranges, (ii) arylene groups having from about 5 carbon atoms to about 15 carbon atoms, such as from about 5 carbon atoms to about 13 carbon atoms or from about 5 carbon atoms to about 10 carbon atoms, although the number of carbon atoms can be outside of these ranges, (iii) arylalkylene groups having from about 6 carbon atoms to about 32 carbon atoms, such as from about 7 carbon atoms to about 33 carbon atoms or from about 8 carbon atoms to about 15 carbon atoms, although the number of carbon atoms can be outside of these ranges, or (iv) alkylarylene groups having from about 6 carbon atoms to about 32 carbon atoms, such as from about 6 carbon atoms to about 22 carbon atoms or from about 7 carbon atoms to about 15 carbon atoms, although the number of carbon atoms can be outside of these ranges, wherein the substituents on the substituted alkylene, arylene, arylalkylene, and alkylarylene groups may be halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, and wherein two or more substituents may be joined together to form a ring;

$R_3$ and $R_3'$ each, independently of the other, are either:

(a) photoinitiating groups, such as groups derived from 1-(4-(2-hydroxyethoxy)phenyl)-2-hydroxy-2-methylpropan-1-one, of the formula

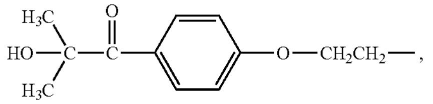

groups derived from 1-hydroxycyclohexylphenylketone, of the formula

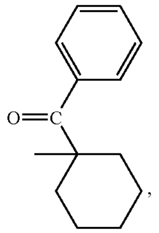

groups derived from 2-hydroxy-2-methyl-1-phenylpropan-1-one, of the formula

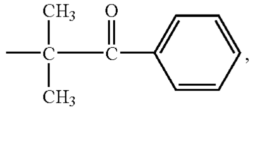

groups derived from N,N-dimethylethanolamine or N,N-dimethylethylenediamine, of the formula

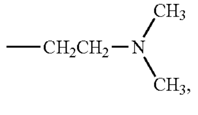

or the like, or:

(b) a group which is:

(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group) having from about 2 carbon atoms to about 100 carbon atoms, such as from about 3 carbon atoms to about 60 carbon atoms or from about 4 carbon atoms to about 30 carbon atoms, (ii) an aryl group (including substituted and unsubstituted aryl groups, and wherein heteroatoms, such as oxygen, nitrogen, sulfur, silicon, phosphorus, boron, and the like either may or may not be present in the aryl group) having from about 5 carbon atoms to about 100 carbon atoms, such as from about 5 carbon atoms to about 60 carbon atoms or from about 6 carbon atoms to about 30 carbon atoms, such as phenyl or the like, (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group) having from about 5 carbon atoms to about 100 carbon atoms, such as from about 5 carbon atoms to about 60 carbon atoms or from about 6 carbon atoms to about 30 carbon atoms, such as benzyl or the like, or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group) having from about 5 carbon atoms to about 100 carbon atoms, such as from about 5 carbon atoms to about 60 carbon atoms or from about 6 carbon atoms to about 30 carbon atoms, such as tolyl or the like, wherein the substituents on the substituted alkyl, arylalkyl, and alkylaryl groups may be halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring;

and X and X' each, independently of the other, is an oxygen atom or a group of the formula —$NR_4$—, wherein $R_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, having from about 5 carbon atoms to about 100 carbon atoms, such as from about 5 carbon atoms to about 60 carbon atoms or from about 6 carbon atoms to about 30 carbon atoms, (iii) an aryl group, including substituted and unsubstituted aryl groups, and wherein heteroatoms either may or may not be present in the aryl group, having from about 5 carbon atoms to about 100 carbon atoms, such as from about 5 carbon atoms to about 60 carbon atoms or from about 6 carbon atoms to about 30 carbon atoms, (iv) an arylalkyl group, including substituted and unsubstituted arylalkyl groups, wherein the alkyl portion of the arylalkyl group may be linear or branched, saturated or unsaturated, and cyclic or acyclic, and wherein heteroatoms either may or may not be present in either the aryl or the alkyl portion of the arylalkyl group, having from about 5 carbon atoms to about 100 carbon atoms, such as from about 5 carbon atoms to about 60 carbon atoms or from about 6 carbon atoms to about 30 carbon atoms, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, having from about 5 carbon atoms to about 100 carbon atoms, such as from about 5 carbon atoms to about 60 carbon atoms or from about 6 carbon atoms to about 30 carbon atoms, wherein the substituents on the substituted alkyl, aryl, arylalkyl, and alkylaryl groups may be halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups: azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring.

Specific suitable substituents and gellants of the above are further set forth in U.S. Pat. Nos. 7,279,587 and 7,276,614, incorporated herein by reference, and thus are not further detailed herein.

In embodiments, the gellant may comprise a mixture comprising:

(I)

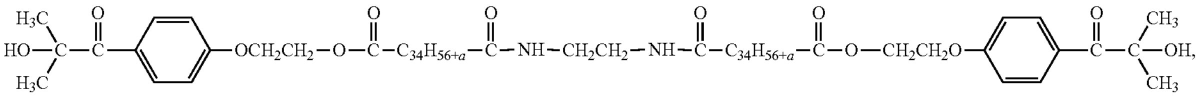

(II)

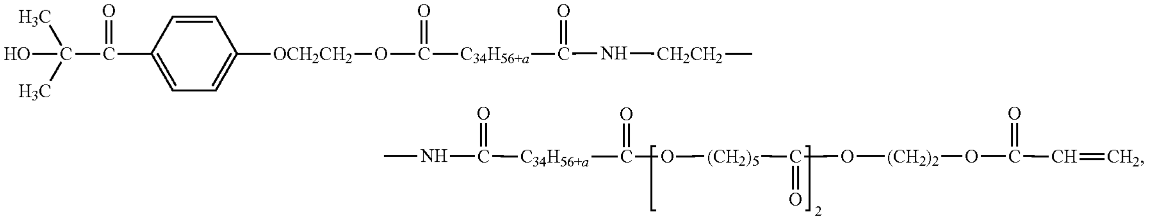

and (III)

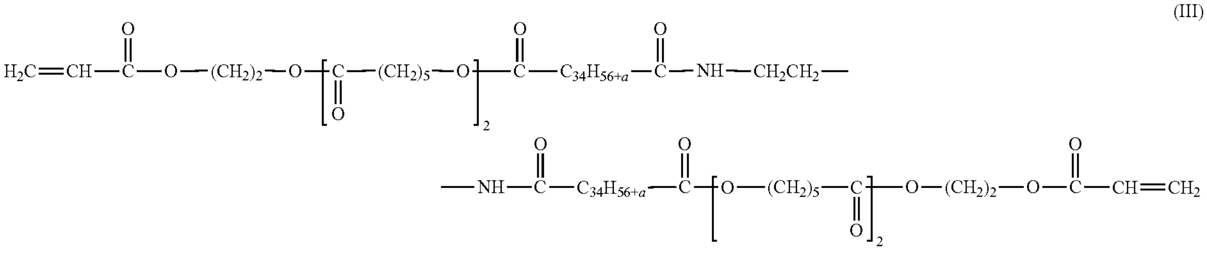

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12.

In embodiments, the gellant may be a composite gellant, for example comprised of a curable epoxy resin and a polyamide resin. Suitable composite gellants are described in commonly assigned U.S. Patent Application Publication No. 2007/0120921, the entire disclosure of which is incorporated herein by reference.

The epoxy resin component in the composite gellant can be any suitable epoxy group-containing material. In embodiments, the epoxy group containing component includes the diglycidyl ethers of either polyphenol-based epoxy resin or a polyol-based epoxy resin, or mixtures thereof. That is, in embodiments, the epoxy resin has two epoxy functional groups that are located at the terminal ends of the molecule. The polyphenol-based epoxy resin in embodiments is a bisphenol A-co-epichlorohydrin resin with not more than two glycidyl ether terminal groups. The polyol-based epoxy resin can be a dipropylene glycol-co-epichlorohydrin resin with not more than two glycidyl ether terminal groups. Suitable epoxy resins have a weight average molecular weight in the range of about 200 to about 800, such as about 300 to about 700. Commercially available sources of the epoxy resins are, for example, the bisphenol-A based epoxy resins from Dow Chemical Corp. such as DER 383, or the dipropyleneglycol-based resins from Dow Chemical Corp. such as DER 736. Other sources of epoxy-based materials originating from natural sources may be used, such as epoxidized triglyceride fatty esters of vegetable or animal origins, for example epoxidized linseed oil, rapeseed oil and the like, or mixtures thereof. Epoxy compounds derived from vegetable oils such as the VIKOFLEX line of products from Arkema Inc., Philadelphia Pa. may also be used. The epoxy resin component is thus functionalized with acrylate or (meth)acrylate, vinyl ether, allyl ether and the like, by chemical reaction with unsaturated carboxylic acids or other unsaturated reagents. For example, the terminal epoxide groups of the resin become ring-opened in this chemical reaction, and are converted to (meth)acrylate esters by esterification reaction with (meth) acrylic acid.

As the polyamide component of the epoxy-polyamide composite gellant, any suitable polyamide material may be used. In embodiments, the polyamide is comprised of a polyamide resin derived from a polymerized fatty acid such as those obtained from natural sources (for example, palm oil, rapeseed oil, castor oil, and the like, including mixtures thereof) or the commonly known hydrocarbon "dimer acid," prepared from dimerized C-18 unsaturated acid feedstocks such as oleic acid, linoleic acid and the like, and a polyamine, such as a diamine (for example, alkylenediamines such as ethylenediamine, DYTEK® series diamines, poly(alkyleneoxy)diamines, and the like, or also copolymers of polyamides such as polyester-polyamides and polyether-polyamides. One or more polyamide resins may be used in the formation of the gellant. Commercially available sources of the polyamide resin include, for example, the VERSAMID series of polyamides available from Cognis Corporation (formerly Henkel Corp.), in particular VERSAMID 335, VERSAMID 338, VERSAMID 795 and VERSAMID 963, all of which have low molecular weights and low amine numbers. The SYLVAGEL® polyamide resins from Arizona Chemical Company, and variants thereof including polyether-polyamide resins may be employed. The composition of the SYLVAGEL® resins obtained from Arizona Chemical Company are described as polyalkyleneoxydiamine polyamides with the general formula,

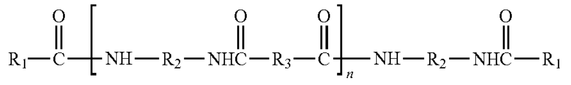

wherein $R_1$ is an alkyl group-having at least seventeen carbons, $R_2$ includes a polyalkyleneoxide, $R_3$ includes a C-6 carbocyclic group, and n is an integer of at least 1.

The gellant may also comprise a curable polyamide-epoxy acrylate component and a polyamide component, such as disclosed, for example, in commonly assigned U.S. Patent Application Publication No. 2007/0120924, the entire disclosure of which is incorporated herein by reference. The curable polyamide-epoxy acrylate is curable by virtue of including at least one functional group therein. As an example, the polyamide-epoxy acrylate is difunctional. The functional group(s), such as the acrylate group(s), are radiation curable via free-radical initiation and enable chemical bonding of the gellant to the cured ink vehicle. A commercially available polyamide-epoxy acrylate is PHOTOMER® RM370 from Cognis. The curable polyamide-epoxy acrylate may also be selected from within the structures described above for the curable composite gellant comprised of a curable epoxy resin and a polyamide resin.

The composition may include the gellant in any suitable amount, such as about 1% to about 50% by weight of the composition. In embodiments, the gellant may be present in an amount of about 2% to about 20% by weight of the composition, such as about 3% to about 10% by weight of the composition, although the value can also be outside of this range.

Examples of the at least one curable monomer of the composition include propoxylated neopentyl glycol diacrylate (such as SR-9003 from Sartomer), diethylene glycol diacrylate, triethylene glycol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, propoxylated glycerol triacrylate, isobornyl methacrylate, lauryl acrylate, lauryl methacrylate, neopentyl glycol propoxylate methylether monoacrylate, isodecylmethacrylate, caprolactone acrylate, 2-phenoxyethyl acrylate, isooctylacrylate, isooctylmethacrylate, butyl acrylate, mixtures thereof and the like.

The term "curable monomer" is also intended to encompass curable oligomers, which may also be used in the composition. Examples of suitable radiation curable oligomers that may be used in the overcoat compositions have a low viscosity, for example, from about 50 cPs to about 10,000 cPs, such as from about 75 cPs to about 7,500 cPs or from about 100 cPs to about 5,000 cPs. Examples of such oligomers may include CN549, CN131, CN131B, CN2285, CN 3100, CN3105, CN132, CN133, CN 132, available from Sartomer Company, Inc., Exeter, Pa., Ebecryl 140, Ebecryl 1140, Ebecryl 40, Ebecryl 3200, Ebecryl 3201, Ebecryl 3212, available from Cytec Industries Inc, Smyrna Ga., PHOTOMER 3660, PHOTOMER 5006F, PHOTOMER 5429, PHOTOMER 5429F, available from Cognis Corporation, Cincinnati, Ohio, LAROMER PO 33F, LAROMER PO 43F, LAROMER PO 94F, LAROMER UO 35D, LAROMER PA 9039V, LAROMER PO 9026V, LAROMER 8996, LAROMER 8765, LAROMER 8986, available from BASF Corporation, Florham Park, N.J., and the like.

In embodiments, the curable monomer includes both a propoxylated neopentyl glycol diacrylate (such as SR-9003 from Sartomer) and a dipentaerythritol pentaacrylate (such as SR399LV from Sartomer). The inclusion of the pentaacrylate is advantageous in providing more functionality, and thus more reactivity, compared to the diacrylate. However, the amount of the pentaacrylate needs to be limited in the overcoat composition as too much can adversely affect the viscosity of the composition at application temperatures. The pentaacrylate thus makes up 10% by weight or less of the composition, such as 0.5 to 5% by weight of the composition.

The curable monomer may be included in the composition in an amount of, for example, about 20 to about 95% by weight of the overcoat composition, such as about 30 to about 85% by weight of the composition, or about 40 to about 80% by weight of the composition.

The overcoat composition may optionally further include at least one photoinitiator for initiating curing, for example UV curing. Any photoinitiator that absorbs radiation, for example UV light radiation, to initiate curing of the curable components of the formulation may be used, although it is desirable if the photoinitiator does not substantially produce a yellow coloration upon cure.

Examples of free-radical photoinitiators, suitable for use with compositions including acrylate and/or amide groups, include benzophenones, benzoin ethers, benzil ketals, α-hydroxyalkylphenones, and acylphosphine photoinitiators, such as sold under the trade designations of IRGACURE and DAROCUR from Ciba. Specific examples of suitable photoinitiators include 2,4,6-trimethylbenzoyldiphenylphosphine oxide (available as BASF LUCIRIN TPO); 2,4,6-trimethylbenzoylethoxyphenylphosphine oxide (available as BASF LUCIRIN TPO-L); bis(2,4,6-trimethylbenzoyl)-phenylphosphine oxide (available as Ciba IRGACURE 819) and other acyl phosphines; 2-methyl-1-(4-methylthio)phenyl-2-(4-morphorlinyl)-1-propanone (available as Ciba IRGACURE 907) and 1-(4-(2-hydroxyethoxy)phenyl)-2-hydroxy-2-methylpropan-1-one (available as Ciba IRGACURE 2959); 2-hydroxy-1-(4-(4-(2-hydroxy-2-methylpropionyl)-benzyl)-phenyl)-2-methylpropan-1-one (available as Ciba IRGACURE 127); titanocenes; isopropylthioxanthone (ITX); 1-hydroxy-cyclohexylphenylketone; benzophenone; 2,4,6-trimethylbenzophenone; 4-methylbenzophenone; diphenyl-(2,4,6-trimethylbenzoyl)phosphine oxide; 2,4,6-trimethylbenzoylphenylphosphinic acid ethyl ester; oligo(2-hydroxy-2-methyl-1-(4-(1-methylvinyl)phenyl)propanone); 2-hydroxy-2-methyl-1-phenyl-1-propanone; benzyl-dimethylketal; and mixtures thereof.

An amine synergist, that is, co-initiators that donate a hydrogen atom to a photoinitiator and thereby form a radical species that initiates polymerization (amine synergists can also consume oxygen dissolved in the formulation—as oxygen inhibits free-radical polymerization its consumption increases the speed of polymerization), for example such as ethyl-4-dimethylaminobenzoate and 2-ethylhexyl-4-dimethylamino-benzoate, may also be included.

In embodiments, the photoinitiator package may include at least one alpha-hydroxy ketone photoinitiator and at least one phosphinoyl type photoinitiator(s). One example of the alpha-hydroxy ketone photoinitiator is IRGACURE 127, while one example of the phosphinoyl type photoinitiator is IRGACURE 819, both available from Ciba-Geigy Corp., Tarrytown, N.Y. The ratio of the alpha-hydroxy ketone photoinitiator to the phosphinoyl type photoinitiator may be, for example, from about 90:10 to about 10:90, such as from about 80:20 to about 20:80 or from about 70:30 to about 30:70.

The total amount of photoinitiator included in the overcoat composition may be, for example, from about 0 to about 15%, such as from about 0.5 to about 10%, by weight of the composition. In embodiments, the composition may be free of photoinitiators, for example where e-beam radiation is used as the curing energy source.

The composition also includes at least one curable wax. A wax is solid at room temperature, specifically at 25° C. Inclusion of the wax thus may promote an increase in viscosity of the composition as it cools from the application temperature. Thus, the wax may also assist the gellant in avoiding bleeding of the composition through the substrate.

The curable wax may be any wax component that is miscible with the other components and that will polymerize with the curable monomer to form a polymer. The term wax includes, for example, any of the various natural, modified natural, and synthetic materials commonly referred to as waxes.

Suitable examples of curable waxes include those waxes that include or are functionalized with curable groups. The curable groups may include, for example, acrylate, methacrylate, alkene, allylic ether, epoxide, oxetane, and the like. These waxes can be synthesized by the reaction of a wax equipped with a transformable functional group, such as carboxylic acid or hydroxyl. The curable waxes described herein may be cured with the disclosed monomer(s).

Suitable examples of hydroxyl-terminated polyethylene waxes that may be functionalized with a curable group include, but are not limited to, mixtures of carbon chains with the structure $CH_3—(CH_2)_n—CH_2OH$, where there is a mixture of chain lengths, n, where the average chain length can be in the range of about 16 to about 50, and linear low molecular weight polyethylene, of similar average chain length. Suitable examples of such waxes include, but are not limited to, the UNILIN® series of materials such as UNILIN® 350, UNILIN® 425, UNILIN® 550 and UNILIN® 700 with $M_n$ approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Exemplary Guerbet alcohols include those containing about 16 to about 36 carbons, many of which are commercially available from Jarchem Industries Inc., Newark, N.J. PRIPOL® 2033 (C-36 dimer diol mixture including isomers of the formula

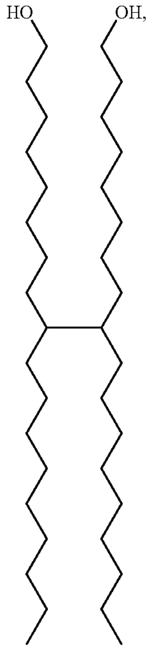

as well as other branched isomers that may include unsaturations and cyclic groups, available from Uniqema, New Castle, Del.; further information on $C_{36}$ dimer diols of this type is disclosed in, for example, "Dimer Acids," *Kirk-Othmer Encyclopedia of Chemical Technology*, Vol. 8, $4^{th}$ Ed. (1992), pp. 223 to 237, the disclosure of which is totally incorporated herein by reference, may also be used. These alcohols can be reacted with carboxylic acids equipped with UV curable moieties to form reactive esters. Examples of these acids include acrylic and methacrylic acids, available from Sigma-Aldrich Co.

Suitable examples of carboxylic acid-terminated polyethylene waxes that may be functionalized with a curable group include mixtures of carbon chains with the structure $CH_3—(CH_2)_n—COOH$, where there is a mixture of chain lengths, n, where the average chain length is about 16 to about 50, and linear low molecular weight polyethylene, of similar average chain length. Suitable examples of such waxes include, but are not limited to, UNICID® 350, UNICID® 425, UNICID® 550 and UNICID® 700 with $M_n$ equal to approximately 390, 475, 565 and 720 g/mol, respectively. Other suitable waxes have a structure $CH_3—(CH_2)_n—COOH$, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Exemplary Guerbet acids include those containing 16 to 36 carbons, many of which are commercially available from Jarchem Industries Inc., Newark, N.J. PRIPOL® 1009 (C-36 dimer acid mixture including isomers of the formula

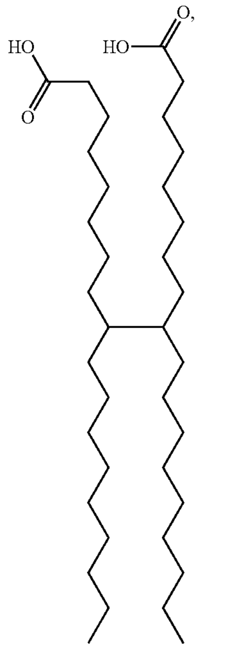

as well as other branched isomers that may include unsaturations and cyclic groups, available from Uniqema, New Castle, Del.; further information on $C_{36}$ dimer acids of this type is disclosed in, for example, "Dimer Acids," *Kirk-Othmer Encyclopedia of Chemical Technology*, Vol. 8, $4^{th}$ Ed. (1992), pp. 223 to 237, the disclosure of which is totally incorporated herein by reference, can also be used. These carboxylic acids can be reacted with alcohols equipped with UV curable moieties to form reactive esters. Examples of these alcohols include, but are not limited to, 2-allyloxyethanol from Sigma-Aldrich Co.;

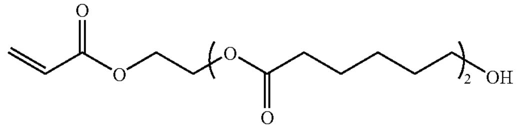

SR495B from Sartomer Company, Inc.;

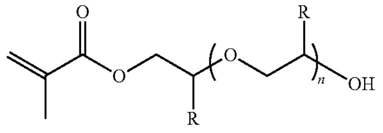

CD572 (R═H, n=10) and SR604 (R≦Me, n=4) from Sartomer Company, Inc.

The curable wax can be included in the composition in an amount of from, for example, about 0.1% to about 30% by weight of the composition, such as from about 0.5% to about 20% or from about 0.5% to 15% by weight of the composition.

The composition may also optionally contain an antioxidant stabilizer. The optional antioxidants of the compositions protect the images from oxidation and also protect the ink components from oxidation during the heating portion of the ink preparation process. Specific examples of suitable antioxidant stabilizers include NAUGARD™ 524, NAUGARD™ 635, NAUGARD™ A, NAUGARD™ I-403, and NAUGARD™ 959, commercially available from Crompton Corporation, Middlebury, Conn.; IRGANOX™ 1010, and IRGASTAB UV 10, commercially available from Ciba Specialty Chemicals; GENORAD 16 and GENORAD 40 commercially available from Rahn A G, Zurich, Switzerland, and the like.

The composition may further optionally include conventional additives to take advantage of the known functionality associated with such conventional additives. Such additives may include, for example, defoamers, surfactants, slip and leveling agents, etc.

The composition desirably does not yellow upon curing, with little to no measurable difference in any of L* a* b* values or k, c, m, y being observed. Being "substantially non-yellowing" refers to the overcoat composition changing color or hue upon curing in an amount of less than about 15%, such as less than about 10% or less than about 5%, for example about 0%.

In embodiments, the composition described herein may be prepared by mixing the composition components such as the curable monomer, curable wax, gellant and optional colorant at a temperature of from about 75° C. to about 120° C., such as from about 80° C. to about 110° C. or from about 75° C. to about 100° C., until homogenous, for example for from about 0.1 hour to about 3 hours, such as about 2 hours. Once the mixture is homogenous, then any photoinitiator may be added. Alternatively, all of the components of the composition may be combined immediately and mixed together.

In the methods of controlling gloss with the composition, the amount of oxygen present in the atmosphere surrounding the composition when it is cured by exposure to the appropriate radiation source is controlled. Control, in this regard, requires that the amount of oxygen present in the atmosphere be pre-selected on the basis of some criteria, for example on the basis of a desired end gloss to be obtained in an image formed using the composition, and the atmosphere around the composition and substrate be set to be substantially equal to the pre-selected amount, for example within about 5% of the pre-selected amount. Thus, curing the composition in ambient air is not controlling the oxygen in the atmosphere as used herein, unless that amount of oxygen was pre-selected and set via the control of the atmosphere as discussed above.

The controlling of the amount of oxygen may be achieved by conducting the curing in a chamber or housing, and controlling the amount of oxygen in an atmosphere fed into the chamber or housing. The chamber or housing need not be completely closed, and desirably includes openings to permit feeding of the substrate therethrough. The atmosphere with the desired oxygen content is fed into the housing or chamber, including being fed over the substrate having the composition thereon, to control the atmosphere around the image and substrate.

The controlling of the amount of oxygen in the curing operation can be controlled by any suitable method. For example, additional oxygen may be introduced into the atmosphere by compressed gas cylinders, or generated by molecular sieve or membrane concentrators. On the other hand, atmospheric oxygen may be displaced from the atmosphere by use of nitrogen, carbon dioxide, argon, or helium from compressed gas cylinders or generated by molecular sieve or membrane concentrators.

In embodiments, the amount of oxygen in the curing atmosphere is set to be substantially zero, including completely zero. This may be done by, for example, curing the image in an inert atmosphere, for example comprised of argon gas, nitrogen gas, carbon dioxide gas and the like. Typically, when the compositions herein are cured in an atmosphere substantially free of oxygen, the image exhibits the highest gloss level achievable with the composition.

In further embodiments, the amount of oxygen in the curing atmosphere is set to be from about 0.5% to about 15% of the atmosphere. This amount of oxygen is less than the amount of oxygen typically in ambient air (~20%), and provides a glossier image than ambient air, but less glossy compared to curing in substantially no oxygen.

In further embodiments, the amount of oxygen in the curing atmosphere is set to be from about 20% to about 35% of the atmosphere. This amount of oxygen typically provides an image with less gloss, or a more matte finish, compared to curing in the presence of less oxygen as described above. Curing in the presence of an amount of oxygen of from about 25% to about 35% typically provides a more matte finish compared to curing in ambient air.

Increasing the amount of oxygen present during cure beyond about 35% is possible, although increased amounts of oxygen begin to interfere with the curing of the composition. Although the increase in viscosity by including the gellant in the composition reduces the diffusion of oxygen into the composition, the greater amount of oxygen in the air, the more the oxygen may adversely affect the completeness of the curing.

In embodiments, the control of the amount of the amount of oxygen may comprise providing a desired gloss to a database including one or more lookup tables for the colored or colorless composition, wherein the one or more lookup tables comprise the gloss provided by the composition using different amounts of oxygen in the atmosphere during curing. This method can be used to determine the amount of oxygen to be present in the atmosphere to achieve the desired gloss. The amount of oxygen in the atmosphere can then be set to be substantially equal to the amount of oxygen provided by the determination, and thus an end image with a gloss substantially equal to the desired gloss obtained.

Information for various lookup tables may be included in the database, from which a computing device, such as a computer, may derive an estimated amount of oxygen necessary to achieve the desired gloss, which derivation may then be used to set the amount of oxygen to use. This feature can be advantageous where the lookup tables do not have exact entries for a given desired gloss.

The composition may be applied directly onto the image receiving substrate, and/or may be applied directly onto an image previously formed on the image receiving substrate. In this regard, the overcoat composition may be applied (1) over portions of (a portion being less than all) or all of at least one printed image formed on the substrate, (2) over one or more portions of the substrate, and over less than all printable portions of the substrate (a printable portion being that portion of a substrate to which a printing device is capable of providing an image), or (3) over substantially all to all printable portions of the substrate. When the composition is applied to less than all portions of a substrate or an image on the substrate, an end image with variable gloss characteristics can be obtained.

When the composition is coated onto an image, parts thereof, substrate, and/or parts thereof, it can be applied at different levels of resolution. For example, the composition can be applied at the resolution of the print halftone dot, at the resolution of distinct part(s) of the image, or at a little less resolution than distinct part(s) of the image, allowing for some overlap of the composition onto nonimaged areas of the substrate. The typical composition deposition level is in an amount of from about 5 to about 50 picoliters drop size. The composition can be applied in at least one pass over the image at any stage in the image formation using any known ink jet printing technique, such as, for example, drop-on-demand ink jet printing including, but not limited to, piezoelectric and acoustic ink jet printing. The application of the composition can be controlled with information used to form an image such that only one digital file is needed to produce the image and the overcoat composition. Thus, the composition may be fully digital.

Following application of the composition, the composition may optionally be leveled by contact or non-contact leveling, for example as disclosed in U.S. patent application Ser. No. 12/023,979, filed Jan. 31, 2008, incorporated herein by reference in its entirety.

Following application, the applied composition is typically cooled to below the gel point of the composition in order to take advantage of the properties of the gelling agent. The composition may then be exposed to radiation (curing energy) to cure the composition, in the presence of the controlled amount of oxygen. Upon exposure to a suitable source of curing energy, for example, ultraviolet light, the photoinitiator absorbs the energy and sets into motion a reaction that converts the gel-like composition into a cured material. The viscosity of the composition further increases upon exposure to the suitable source of curing energy, such that it hardens to a solid. The monomer and wax, and optionally the gellant, in the composition contain functional groups that polymerize as a result of the exposure of the photoinitiator to radiation, forming a polymer network. In the absence of photoinitiators these functional groups may polymerize as a result of exposure to e-beam radiation. This polymer network provides printed images with, for example, durability, thermal and light stability, and scratch and smear resistance. The end image derived can be made to have a gloss substantially equal to the desired gloss as above.

The energy source used to initiate crosslinking of the radiation curable components of the composition can be actinic, for example, radiation having a wavelength in the ultraviolet or visible region of the spectrum, accelerated particles, for example, electron beam radiation, thermal, for example, heat or infrared radiation, or the like. In embodiments, the energy is actinic radiation because such energy provides excellent control over the initiation and rate of crosslinking. Suitable sources of actinic radiation include mercury lamps, xenon lamps, carbon arc lamps, tungsten filament lamps, lasers, light emitting diodes, sunlight, electron beam emitters and the like.

Ultraviolet radiation, especially from a medium pressure mercury lamp with a high speed conveyor under UV light, for example, about 20 to about 150 m/min, may be desired, wherein the UV radiation is provided at a wavelength of about 200 to about 500 nm for about less than one second. In embodiments, the speed of the high speed conveyor is about 15 to about 80 m/min under UV light at a wavelength of about 200 to about 450 nm for about 10 to about 50 milliseconds (ms). The emission spectrum of the UV light source generally overlaps the absorption spectrum of the UV-initiator. Optional curing equipment includes, but is not limited to, a reflector to focus or diffuse the UV light, a filter to remove selected wavelengths (IR for example), and a cooling system to remove heat from the UV light source.

The substrate employed can be any appropriate substrate depending upon the end use of the print. Exemplary substrates include plain paper, coated paper, plastics, polymeric films, treated cellulosics, wood, xerographic substrates, ceramics, fibers, metals and mixtures thereof, optionally comprising additives coated thereon.

When using a colored composition to form the image, the image may be partially or fully overcoated with an overcoat composition. The overcoat composition can be the colorless composition described above, or may be another conventional or suitable overcoat composition. This overcoat composition can further be used to alter the end gloss of the image, if desired.

The methods herein thus offer control over the gloss of the end image without requiring use of different compositions of a composition. Of course, use of a device containing multiple different compositions, for example including both colored and colorless compositions, compositions of different colors, or compositions capable of providing different ranges of glosses when curing in the presence of similar amounts of oxygen, may be used.

The disclosure will be illustrated further in the following Examples.

EXAMPLE 1

A colored ink composition was prepared by mixing each of the components indicated in Table 1.

TABLE 1

| Component | wt. % |
|---|---|
| Curable amide gellant | 7.5 |
| UNILIN 350 - acrylate wax | 5.0 |
| SR399LV (Sartomer) | 5.0 |
| DAROCUR ITX | 2.0 |
| IRGACURE 379 | 3.0 |
| IRGACURE 819 | 1.0 |
| IRGACURE 127 | 3.5 |
| IRGASTAB UV10 (Ciba) | 0.2 |
| SR9003 (Sartomer) | 42.8 |
| 10 wt % pigment (black) dispersion | 30.0 |
| TOTAL | 100.0 |

The curable amide gellant is a mixture comprising:

(I)

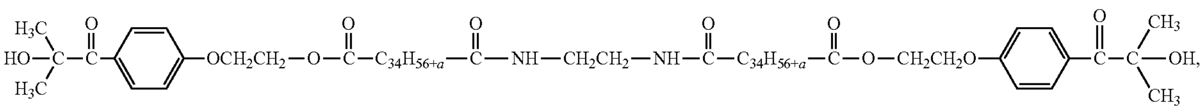

(II)

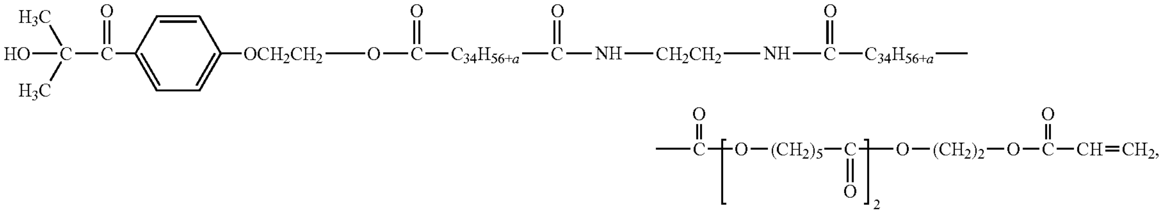

and (III)

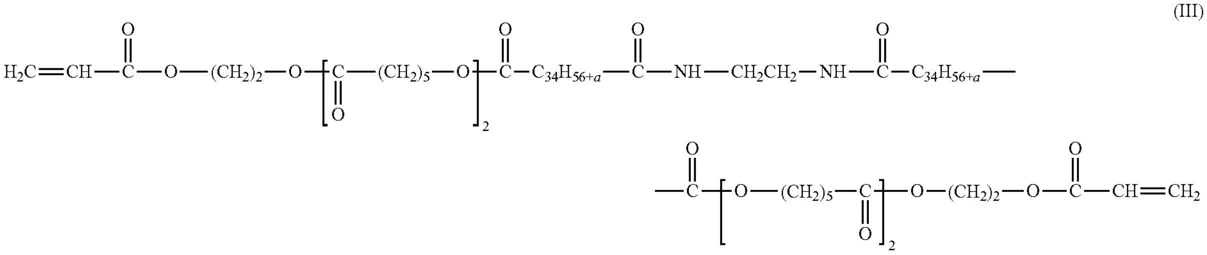

wherein $-C_{34}H_{56+a}-$ represents a branched alkylene group which may include unsaturations and cyclic groups, wherein a is variously an integer of 0, 1, 2, 3, 4, 5, 6, 7, 8, 9, 10, 11, or 12, as described above.

Patches of a black UV-curable ink comprised of the above composition were applied using a draw-down method to a paper substrate and cured using a UV Fusion Lighthammer 6 device at 30 fpm (feet per minute) under either an argon atmosphere (0% oxygen) or an air atmosphere containing 20% oxygen. The patches cured under 0% oxygen were visibly glossier than the same sample cured in air (20% oxygen). The gloss values measured at an angle of 60° (measured using a micro-TRI-gloss meter from BYK Gardner at 60°) were 37.2 GU for the inertly cured sample and 27.3 GU for the air-cured sample. This variation in gloss is easily discernable visually.

EXAMPLE 2

A colorless overcoat composition was prepared by mixing each of the components indicated in Table 2.

TABLE 2

| Component | wt. % |
|---|---|
| Curable amide gellant | 7.5 |
| UNILIN 350 - acrylate wax | 5.0 |
| SR399LV (Sartomer) | 5.0 |
| DAROCUR ITX | 2.0 |
| IRGACURE 819 | 1.0 |
| IRGACURE 127 | 3.5 |
| IRGASTAB UV10 (Ciba) | 0.2 |
| SR9003 (Sartomer) | 75.8 |
| TOTAL | 100.0 |

Patches formed xerographically with a red colored toner using a DC12 device were coated using a draw-down method with the above clear UV-curable gel overcoat formulation.

Overcoated patches were cured as above under either an argon (0% oxygen) atmosphere or in air (20% oxygen). The overcoated patches cured under argon (0% oxygen) were visibly glossier than the overcoated patches cured in air (20% oxygen). The gloss values measured at 60° were 13.0 GU for the argon cured sample and 10.1 GU for the air cured sample. This variation is gloss is easily discernable visually.

COMPARATIVE EXAMPLE 1

The same red patches as above (xerographically formed with the same red toner using a DC12 device) were overcoated with a commercial, high gloss overcoat (ANCHOR 48001 ULTRACOAT UV X2 Gloss). Overcoated patches were cured as above under either an argon (0% oxygen) atmosphere or in air (20% oxygen). No variation in gloss with different curing atmosphere was observed. The red glossiness measured at 60° was 14.8 GU when cured under argon and 14.9 GU when cured under air (20% oxygen). This result shows that the controllable gloss achieved with the compositions described herein is due at least in part to the formulation of the composition.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A method of controlling gloss of an image, comprising:

forming an image over a substrate by applying a colored composition over one or more portions of the substrate;

applying an overcoat composition over one or more portions of the formed image, wherein the overcoat composition is colorless, and is comprised of at least one gellant, at least one curable monomer, at least one curable wax and optionally at least one photoinitiator, the applying being done at a temperature of 50° C. to 120° C.;

cooling the applied overcoat composition to a temperature below a gel point of the at least one gellant to achieve a gel state; and curing the overcoat composition in a single step following the cooling by applying radiation to the overcoat composition and, during the curing, controlling an amount of oxygen present in an atmosphere around the overcoat composition, wherein the amount of oxygen present in the atmosphere around the overcoat composition is controlled by preselecting the amount of oxygen to be present in the atmosphere around the overcoat composition based upon a desired gloss to be exhibited by the image, and then setting the amount of oxygen in the atmosphere by either increasing the amount of oxygen in the atmosphere of a chamber or housing where the curing is conducted to correspond to the pre-selected amount by introducing into the chamber or housing oxygen from a gas cylinder or generated by molecular sieve or membrane concentrator, or decreasing the amount of oxygen in the atmosphere of the chamber or housing where the curing is conducted to correspond to the pre-selected amount by introducing into the chamber or housing nitrogen, carbon dioxide, argon or helium from a gas cylinder or generated by molecular sieve or membrane concentrator.

2. The method according to claim 1, wherein the controlling of the amount of oxygen comprises providing a desired gloss to a database including one or more lookup tables for the overcoat composition, wherein the one or more lookup tables comprise the gloss provided by the composition using different amounts of oxygen in the atmosphere during curing, to determine the amount of oxygen to be present in the atmosphere to achieve the desired gloss, and subsequently setting the amount of oxygen in the atmosphere around the image to be substantially equal to a result of the determination.

3. The method according to claim 1, wherein the amount of oxygen in the atmosphere is controlled to be substantially zero.

4. The method according to claim 1, wherein the amount of oxygen in the atmosphere is controlled to be from about 0.5% to about 15%.

5. The method according to claim 1, wherein the amount of oxygen in the atmosphere is controlled to be from about 20% to about 35%.

6. The method according to claim 1, wherein the at least one curable monomer is selected from the group consisting of propoxylated neopentyl glycol diacrylate, diethylene glycol diacrylate, triethylene glycol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, isobornyl methacrylate, lauryl acrylate, lauryl methacrylate, isodecylmethacrylate, propoxylated glycerol triacrylate, lauryl acrylate, neopentyl glycol propoxylate methylether monoacrylate, caprolactone acrylate, 2-phenoxyethyl acrylate, isooctylacrylate, isooctylmethacrylate, butyl acrylate, and mixtures thereof, and wherein the at least one gellant comprises at least one amide gellant.

7. The method according to claim 6, wherein the at least one gellant is a mixture comprising:

(I)

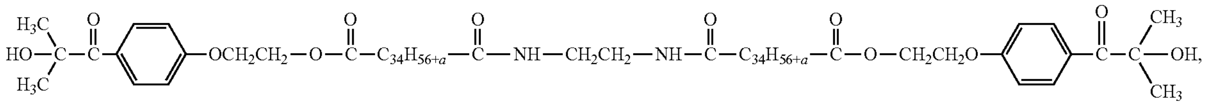

(II)

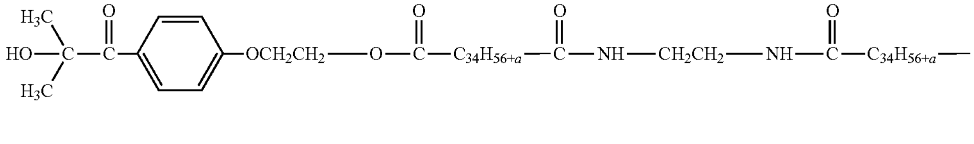

-continued

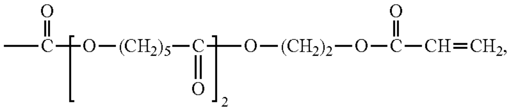

and (III)

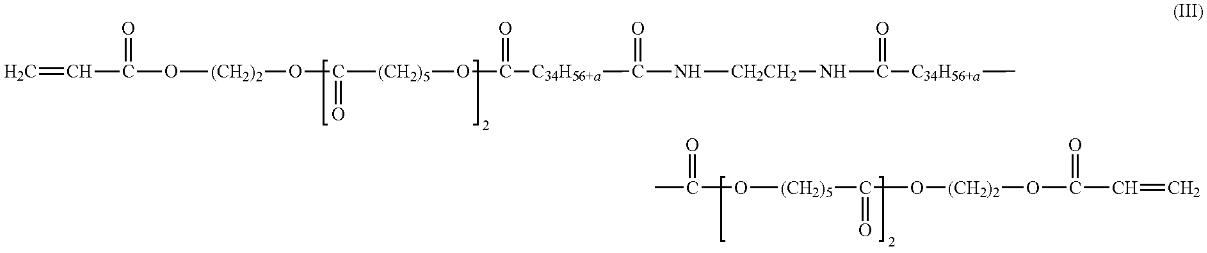

wherein $—C_{34}H_{56+a}—$ represents a branched alkylene group which may include unsaturations and cyclic groups, wherein a is an integer of 0, 1, 2, 3, 4, 5, 6, 7, 8, 9, 10; 11, or 12.

8. The method according to claim 6, wherein the at least one curable wax comprises a hydroxyl-terminated polyethylene wax functionalized with at least one curable group.

9. The method according to claim 8, wherein the at least one curable wax comprises a reaction product of a hydroxyl-terminated polyethylene wax and an acrylate.

* * * * *